(12) United States Patent
Lind (10) Patent No.: US 9,701,467 B2
(45) Date of Patent: Jul. 11, 2017

(54) COMBINATION TANK

(71) Applicant: SAG Motion GmbH, Lend (AT)

(72) Inventor: Christoph Lind, Gleisdorf (AT)

(73) Assignee: SAG Motion GmbH, Lend (AT)

( * ) Notice: Subject to any disclaimer, the term of this patent is extended or adjusted under 35 U.S.C. 154(b) by 183 days.

(21) Appl. No.: 14/470,145

(22) Filed: Aug. 27, 2014

(65) Prior Publication Data
US 2015/0060466 A1 Mar. 5, 2015

(30) Foreign Application Priority Data

Aug. 30, 2013 (DE) .................... 20 2013 103 931 U (51) Int. Cl.
| | |
|---|---|
| *B65D 81/38* | (2006.01) |
| *B65D 90/02* | (2006.01) |
| *B60K 15/03* | (2006.01) |
| *F17C 3/04* | (2006.01) |
| *F17C 13/00* | (2006.01) |

(52) U.S. Cl.
CPC ............ *B65D 90/028* (2013.01); *B60K 15/03* (2013.01); *B60K 15/03006* (2013.01); *B65D 81/3802* (2013.01); *B65D 81/3806* (2013.01); *B65D 81/3809* (2013.01); *F17C 3/04* (2013.01); *F17C 13/005* (2013.01); *B60K 2015/03059* (2013.01); *B60K 2015/03315* (2013.01); *B60K 2015/03355* (2013.01); *B60Y 2200/14* (2013.01); *F17C 2201/01* (2013.01); *F17C 2203/0626* (2013.01); *F17C 2203/0629* (2013.01); *F17C 2203/0639* (2013.01); *F17C 2209/221* (2013.01); *Y10S 220/901* (2013.01)

(58) Field of Classification Search
CPC .......... Y10S 220/901; F17C 2203/0626; F17C 2203/0629; F17C 2209/221; B65D 90/028; B65D 81/3806; B65D 81/3809; B65D 81/3802; Y10T 137/4824; Y10T 137/479; B60K 2015/03065; B60K 2015/03355
See application file for complete search history.

(56) References Cited

U.S. PATENT DOCUMENTS

| | | | | |
|---|---|---|---|---|
| 1,152,299 | A * | 8/1915 | Corr .......................... | F25D 3/08 126/281 |
| 1,636,190 | A * | 7/1927 | Mahoney ................ | B60S 3/044 122/115 |
| 2,200,675 | A * | 5/1940 | Northcutt .............. | B05B 7/2408 137/264 |
| 2,933,902 | A * | 4/1960 | Howard .................. | B63B 25/16 114/74 A |

(Continued)

*Primary Examiner* — Atif Chaudry
(74) *Attorney, Agent, or Firm* — Hoffmann & Baron, LLP (57) ABSTRACT

The invention relates to a combination tank having a double-walled inner container for temperature-insulated accommodation of a cryogenic fluid, which inner container has an approximately circular cylindrical cross-section and is closed off with end-side caps, wherein an outer container for accommodating at least one operating material is configured around the inner container, which outer container has a jacket having an approximately rectangular cross-section and end walls supported on the inner container, which end walls either sit in the gussets that remain between inner container and jacket, or are touched or penetrated by the caps of the inner container.

19 Claims, 4 Drawing Sheets

(56) References Cited

U.S. PATENT DOCUMENTS

| | | | | |
|---|---|---|---|---|
| 3,692,206 A | * | 9/1972 | Hornbeck | F17C 3/02 206/445 |
| 4,157,698 A | * | 6/1979 | Viessmann | F24H 1/263 110/326 |
| 5,273,180 A | * | 12/1993 | Whatley, Jr. | B65D 90/24 220/565 |
| 5,465,865 A | * | 11/1995 | Coombes | B65D 21/0209 206/509 |
| 5,469,701 A | * | 11/1995 | Sneddon | B64G 1/402 137/264 |
| 5,555,999 A | * | 9/1996 | Wilcox | B65D 90/24 220/23.91 |
| 2006/0288964 A1 | * | 12/2006 | Schaeche | F24H 1/18 122/13.01 |

* cited by examiner

COMBINATION TANK

FIELD OF INVENTION

The present invention relates to a combination tank having a double-walled inner container for temperature-insulated accommodation of a cryogenic fluid, which inner container has an approximately circular cylindrical cross-section and is closed off with end-side caps.

BACKGROUND

In order to increase the energy content of energy carriers that are gaseous under normal conditions, these are either compressed for transport and storage purposes and stored in pressurized tanks, or cooled to a low temperature and thereby liquefied, at least in part, as a cryogenic fluid, and stored in temperature-insulated containers. Liquefied natural gas (LNG) or liquefied hydrogen, for example, are stored as cryogenic fluids having great energy density, for powering vehicles, and are subsequently utilized to power essentially conventional internal combustion engines or fuel cells of the vehicles.

Aside from the low temperatures, in the case of LNG up to minus 161° C., for example, the container must withstand the elevated pressure of the cryogenic fluid, in the case of LNG up to 16 bar, and therefore has a circular cylindrical cross-section. For insulation, the container is double-walled, where the insulation gap that lies between the two walls is generally evacuated and/or lined with special insulation films/foils. LNG is easier to handle than liquid hydrogen, for example, and more environmentally friendly and cost-advantageous than conventional fuel, such as gasoline or diesel fuel, and therefore of particular interest specifically for utility vehicles having high fuel consumption or a high degree of utilization, for example trucks. On the other hand, neither LNG nor liquid hydrogen is available in a broad distribution network, and because of the low temperature and the high pressures, they are more difficult to store than conventional fuel.

In principle, LNG can be used both in gasoline engines and in diesel engines; when used in engines that work according to the diesel principle, additional diesel fuel is required for ignition. In order to increase the vehicle range and to allow operation with LNG, conventional fuel is frequently carried along in addition, in vehicles equipped for this purpose. This conventional fuel, just like other operating materials, for example AdBlue®, hydraulic oil, etc., is stored in separate tanks for operating materials, and this requires additional construction space.

SUMMARY

The invention has set itself the goal of creating a combination tank that better utilizes the existing construction space and, at the same time, is flexible in use.

This goal is achieved with a combination tank of the type stated initially, which is distinguished in that an outer container for accommodating at least one operating material is configured around the inner container, which outer container has a jacket having an approximately rectangular cross-section and end walls supported on the inner container, which end walls either sit in the gussets that remain between inner container and jacket, or are touched or penetrated by the caps of the inner container.

Such a combination tank can be integrated, in space-saving manner, into the construction space provided for this purpose, which is generally block-shaped in the case of trucks, and, in this connection, can be adapted to existing bracket systems for tank attachment, and therefore can be used like a conventional truck tank. At the same time, the additional jacket offers the more sensitive inner container protection and a firm hold, and the at least one operating material situated in the outer container serves as an additional temperature buffer. The double-walled inner container for the cryogenic fluid does not require any special adaptation, and one or more separate operating material containers that require room are eliminated. In this connection, such a combination tank can be produced in any desired size and using conventional means.

It is advantageous if at least one of the end walls is connected with the inner container and the jacket by means of gluing or welding. This results in a reliably tight connection, in particularly simple manner, and gives the inner container a secure seat; also, the methods of gluing and welding are proven in the production of vehicle tanks.

In a preferred embodiment, the outer wall of the inner container, the jacket of the outer container, and the end walls are produced from metal. Metals are easy to shape, to weld, and are strong and lead to a light, robust combination tank.

In order to reduce the effort for assembly, it is advantageous if the jacket is formed of one piece and closed with a longitudinal weld seam. Alternatively, the jacket can be composed of two, three, or four shaped parts and closed with longitudinal weld seams, in each instance. In this way, the individual parts are easier to handle, and different parts can be combined with one another, which simplifies standardization of parts, with great flexibility in the design of the combination tank. In this way, individual parts also can be left out of the installation, so that the inner container remains visible and accessible from the outside in these regions.

The longitudinal weld seams can merely close the jacket, or each longitudinal weld seam can weld an edge of the jacket to the inner container. It is particularly efficient if the said longitudinal weld seams are structured as triple-sheet weld seams, by means of which the jacket is simultaneously welded to the inner container. In this way, the jacket is closed, edge to edge, and simultaneously fixed in place on the inner container, in a single work step. In this connection, the outer container is divided into individual chambers, which are securely sealed relative to one another, by means of the longitudinal weld seams, and prepared to accommodate different operating materials.

In order to allow an operating material to flow freely also between chambers in the outer container, it is advantageous if the jacket has at least one bead that runs in the circumferential direction and is shaped outward, which bead bridges a region in which the jacket otherwise touches the inner container.

The combination tank is particularly space-saving if a closable opening is configured on a top of the outer container, which opening opens into the bead or into the space between inner container, jacket, and end wall. Alternatively or supplementally, a connector pipe with a closable opening can be formed on an end wall, which connector pipe opens into the outer container. This represents a solution that can easily be installed, and can be combined with all the variants of the combination tank.

Such an opening can serve as a filling opening for an operating material. Alternatively, a fill-level probe can be introduced into the bead, the said space or the connector pipe by way of the opening. In this way, the fill level of the outer container can be detected over its entire region. If desired, the fill-level probe can furthermore be combined with an extraction line, thereby eliminating a further opening in the outer container of the combination tank.

In an advantageous embodiment of the invention, the jacket projects beyond the inner container, in the longitudinal direction, to form an additional container, and is closed off with an end lid. In this way, the size of the combination tank can be increased as desired, and, on the one hand, can comprise a separate container for further operating materials of the vehicle, or, on the other hand, the outer container can be increased in size, in order to thereby increase the possible range of the vehicle, for example, or to achieve an advantageous amount ratio between the cryogenic fluid that is carried along and the operating material(s).

It is advantageous if the jacket has a closable opening in the region of the further container. This leads to particularly simple placement of the opening. The opening can be structured as a filling opening for an operating material; alternatively, a fill-level probe can be introduced into the further container by way of the said opening, and thereby the advantages mentioned with regard to the other variants of openings can be achieved.

If the said further container is used for accommodating the same operating material as the outer container, then particularly preferably, the further container is connected with the outer container by way of connection openings penetrating the end wall that lies in between.

In order to be able to empty the outer container as completely as possible, it is advantageous if a tank sump is formed in the bottom of the outer container, into which sump an extraction line combined with the fill-level probe projects.

BRIEF DESCRIPTION OF THE DRAWINGS

The invention will be explained in greater detail below, using exemplary embodiments shown in the attached drawings. In the drawings, the figures show.

DETAILED DESCRIPTION

Figure 1A:
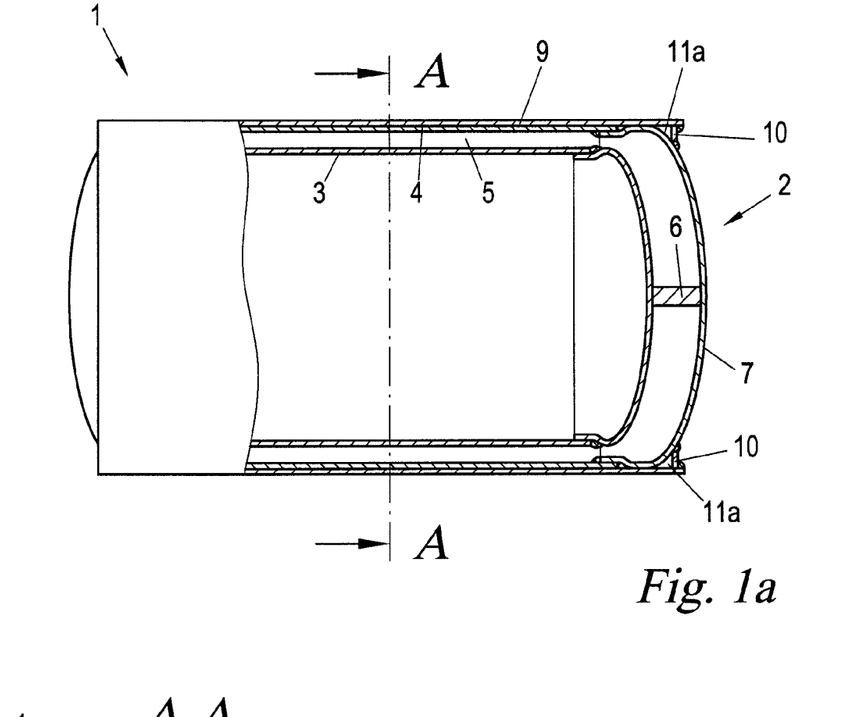
FIG. 1a to 1c, the combination tank according to the invention in a partly sectional side view (FIG. 1a), in cross-section (FIG. 1b), and a face wall of the combination tank of FIG. 1a in a top view (FIG. 1c)
Figure 1B:
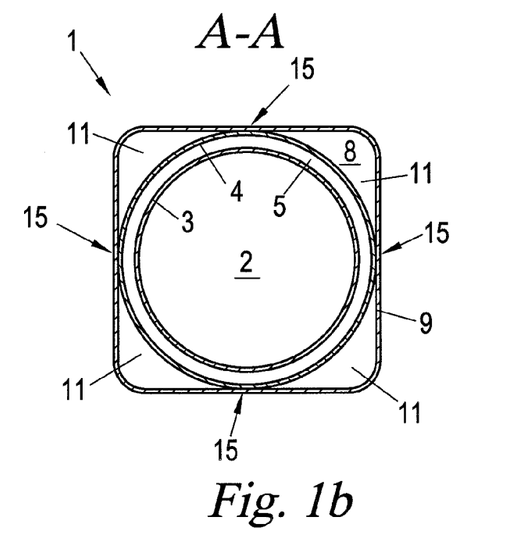

In FIGS. 1a and 1b, a combination tank 1 for combined accommodation of a cryogenic fluid and of at least one operating material is shown. The cryogenic fluid can be natural gas, for example, which is present in liquefied form, at least in part (liquefied natural gas, LNG), at temperatures of up to −161° C. and a pressure of up to 16 bar, or a comparable cryogenic fluid that can be used in internal combustion engines or fuel cells, for example liquefied hydrogen. The combination tank 1 is installed on the chassis of a utility vehicle, for example a truck, or of a passenger car, in the manner of a conventional fuel container, for example, and can correspond with standardized bracket systems for vehicles for this purpose.

To accommodate the cryogenic fluid, the combination tank 1 has a double-walled inner container 2 that is temperature-insulated using an insulation gap 5 configured between an inner wall 3 and an outer wall 4. The insulation gap 5 can be evacuated and/or can contain insulation material. The inner wall 3 that encloses the cryogenic fluid is furthermore mechanically mounted on the outer wall 4, in stable manner, with temperature-conduction-inhibiting supports 6.

In order to be able to withstand the pressure of the cryogenic fluid more easily, the inner wall 3 has a circular cylindrical cross-section (FIG. 1b); the outer wall 4 also has a circular cylindrical cross-section, in order to maintain a constant insulation gap, and is closed off—similar to the inner wall 3—with end-side caps 7.

Inner and outer wall 3, 4 can be deep-drawn, for example, and in this connection the caps 7 can be produced in one piece with at least a part of the outer wall 4. Also, the cross-section of inner and outer wall 3, 4 can deviate slightly from the circular shape, for example it can be oval.

An outer container 8 for accommodating the at least one operating material is configured around the inner container 2. An operating material can be, on the one hand, gasoline, diesel fuel or a similar fuel that is liquid at normal temperature, or, on the other hand, an operating material that is liquid at normal temperature, for example AdBlue®, hydraulic oil, etc., for the vehicle.

For this purpose, the outer container 8 has a jacket 9 having an approximately rectangular cross-section (FIG. 1b), which surrounds the inner container 2 and is supported on the inner container 2 with end walls 10, thereby giving the inner container 2 a firm seat in the outer container 8. In this connection, gussets 11 form between inner container 2 and jacket 9, and are closed off by the end walls 10. Therefore operating material can be stored in the region between outer wall 4 of the inner container 2, and jacket 9 and end walls 10 of the outer container 8, which region forms the outer container 8.

The outer wall 4 of the inner container 2, the jacket 9, and the end walls 10 can be produced from plastic or metal, for example stainless steel or aluminum. They can be produced from materials that are different from one another, also from a material mix of plastics and/or metals, where at least one of the end walls 10 is connected with the inner container 2 and the jacket 9 by means of gluing, welding, or mechanically, for example by means of pressing, folding, riveting or a screw connection. In this regard, different connection methods can also be used.

Figure 1C:
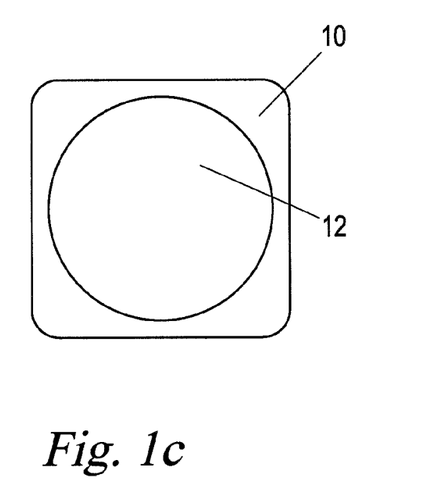

In the embodiment according to FIGS. 1a and 1c, the jacket 9 reaches all the way into the region of the caps 7 of the inner container 2 in its longitudinal expanse, at least on one side. In this case, the end wall 10 is approximately rectangular and has an approximately central, circular recess 12, in each instance (FIG. 1c), at which the cap 7 penetrates the end wall 10 and the two are connected. In this connection, the cap 7 either projects clearly through the end wall 10 (FIG. 1a), or it is set more or less "flush" into the recess 12 (FIG. 3d), in order to support the outer container 8 on the inner container 2. Alternatively, the end wall 10 can also be structured without a circular recess 12 and, in this case, the cap 7 can merely touch the end wall 10 in its central region, for example with contact pressure. In this case, too, cap 7 and end wall 10 can additionally be welded, glued, riveted, or the like, to one another, if desired. In the embodiments of FIG. 1*a*, 1*c* or 3*d*, a space 11*a* forms between inner container 2, jacket 9, and end wall 10, in each instance (FIG. 1*a*).

Alternatively, the jacket 9 could also be shorter, in terms of its longitudinal expanse, at least on one side, and in this regard not project beyond the cylindrical region of the inner container 2. In this case, the end walls 10 are formed from four approximately triangular elements, in each instance, which sit in the gussets 11 that remain between inner container 2 and jacket 9, that is, they are glued, welded, or connected in some other way, where the outer container 8 can be divided into four chambers, separate from one another, which can accommodate different operating materials.

Figure 2A:
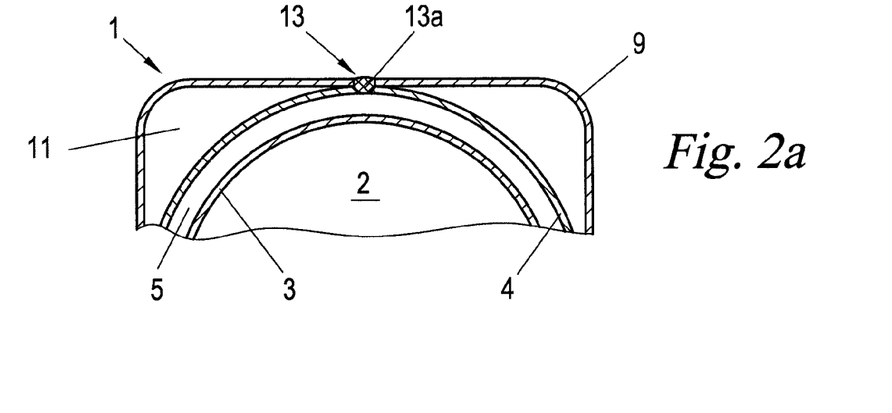
FIGS. 2a-2c, different variants of longitudinal weld seams on the jacket of the combination tank of FIG. 1a in cross-section, specifically a triple-sheet weld seam (FIG. 2a), two conventional longitudinal weld seams, parallel to one another (FIG. 2b), and a longitudinal weld seam for closing the jacket (FIG. 2c)
Figure 2B:
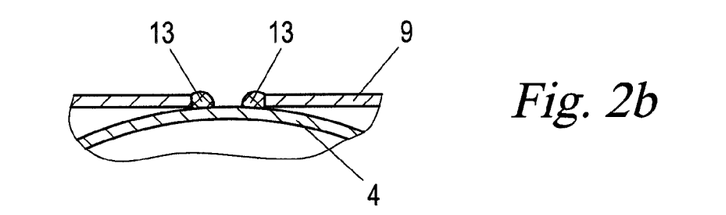
Figure 2C:
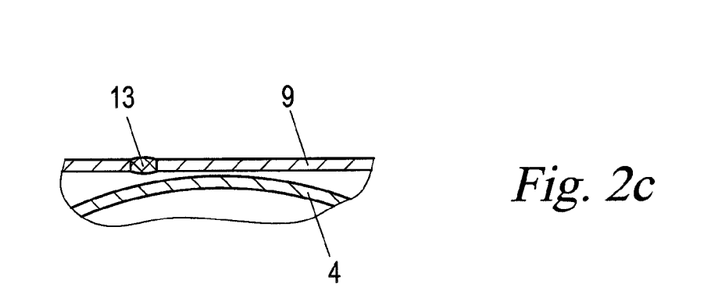

The jacket 9 is formed of one piece, according to FIGS. 2*a* to 2*c*, for example bent from a sheet-metal panel, and closed by means of at least one longitudinal weld seam 13. The longitudinal weld seam 13 is a triple-sheet weld seam 13*a* in the example of FIG. 2*a*, which seam closes off the jacket 9, edge to edge, and at the same time welds it to the outer wall 3 of the inner container 2. Alternatively, each edge of the jacket 9 can be welded to the inner container 2 using a separate longitudinal weld seam 13, and thereby be closed off at the same time (FIG. 2*b*), or merely be closed off, edge to edge, and not welded to the inner container 2 at all (FIG. 2*c*). In the latter case, the longitudinal weld seam 13 can also be provided at a location of the jacket 9 at a distance from the inner container 2, as shown in FIG. 2*c*, or even run at a slant. In this connection, the outer tank 8 is supported on the inner container 2 by means of the end walls 10 and, optionally, by means of additional support walls (not shown) that lie on the inside and run parallel to the end walls 10.

Alternatively, the jacket 9 can also be formed of two half shells or up to four angled pieces, and, in this connection, can be closed, in the manner described above, with two to four longitudinal weld seams 13, 13*a* according to FIG. 2*a* or 2*c*, or, according to FIG. 2*b*, with up to eight longitudinal weld seams 13, and/or welded to the inner container 2, where the longitudinal weld seams 13, 13*a*, together with the suitably inserted end walls 10 composed of triangular elements, can form the separate chambers, sealed relative to one another, for different operating materials, in the outer container 8. If desired, individual triangular elements can furthermore be left out from the installation, so that in these regions, the inner container 2 remains visible and accessible from the outside.

It is understood that instead of the longitudinal weld seam 13, a longitudinal bead of adhesive can also close the jacket 9 and connect it with the inner container 2.

Figure 3A:
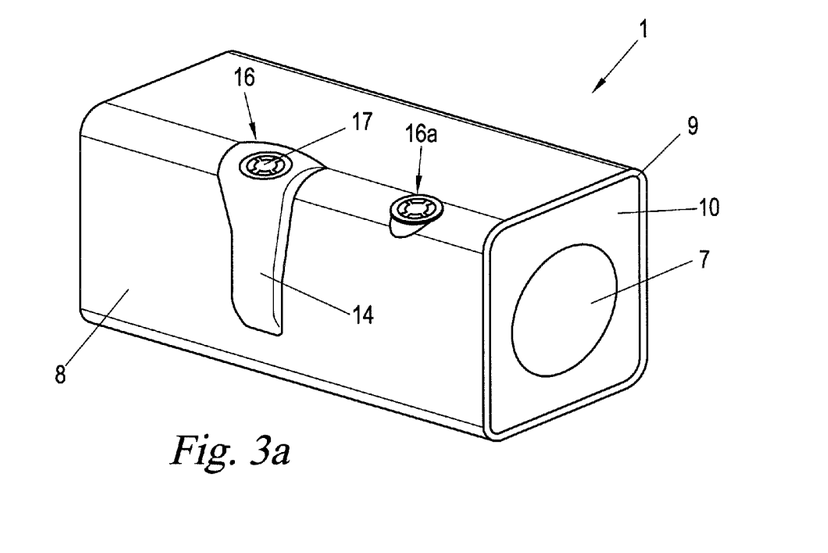
FIG. 3a, two variants of openings on the combination tank of FIG. 1a in a perspective view at a slant from above.

In the example of FIG. 3*a*, the jacket 9 has a bead 14 that is formed outward, running in the circumference direction of the jacket 9. In this connection, the bead 14 bridges a region 15 in which the jacket 9 otherwise touches the inner container 2 (FIG. 1*b*), thereby allowing an operating material to be distributed over multiple chambers or even everywhere in the outer container 8. For the remainder, the operating material can communicate by way of the space 11*a*, in the case of a suitable arrangement of the end walls 10 (FIG. 1*a*).

Such a bead 14 can also be configured on other sides or even on all sides of the jacket 9, in other words in every region 15 (FIG. 1*b*), in which the jacket 9 otherwise touches the inner container 2; also, multiple such beads 14 can be distributed parallel to one another in the longitudinal direction of the jacket 9.

Alternatively, the jacket 9 can have a greater diameter and not stand in contact with the inner container 2 on one or more sides (not shown). In both cases, the outer container 8 is supported on the inner container 2 with its end walls 10 and the optional support walls.

In the exemplary embodiment of FIG. 3*a*, an opening 16 opens into the bead 14, which opening is configured on a top of the outer container 8. The opening 16 is configured in a region of the jacket 9 that has been specifically formed for its better accessibility or orientation. The outer container 8 can be filled with operating material by way of the opening 16, for example, and can be closed off with a bayonet closure 17 or in similar manner.

Figure 3B:
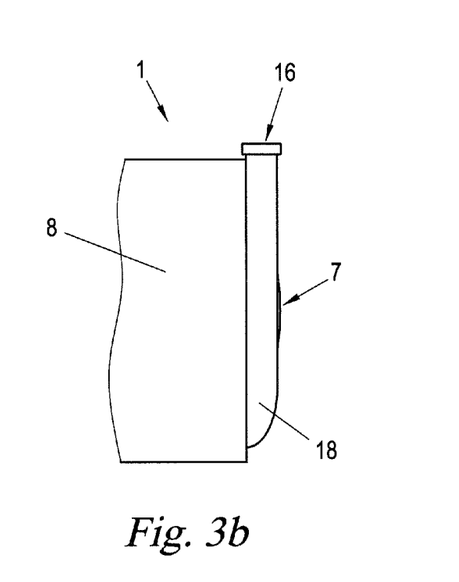
FIGS. 3b and 3c, a connector pipe as a further variant for an opening on the combination tank of FIG. 1a in a side view (FIG. 3b) and top view (FIG. 3c)
Figure 3C:
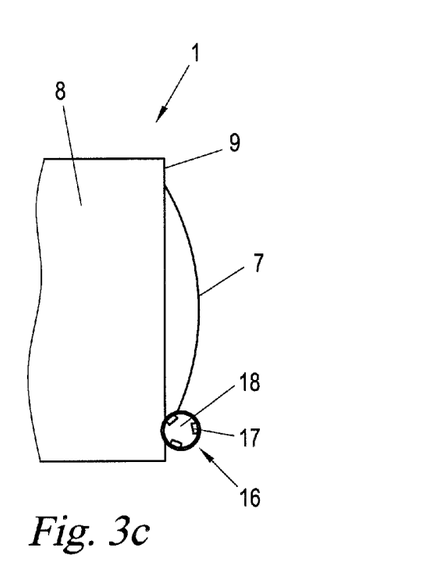
Figure 3D:
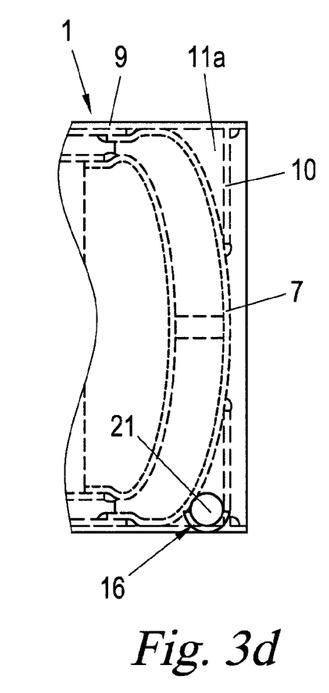
FIGS. 3d and 3e, a further variant of the placement of an opening on the combination tank of FIG. 1a in a top view (FIG. 3d) and a side view (FIG. 3e)

Alternatively or supplementally to the opening 16, a connector pipe 18 is formed, according to the example of FIGS. 3*b* and 3*c*, on an end wall 10 of the outer container 8, which pipe opens into the outer container 8. The connector pipe 18 also has a closable opening 16 with an—optional—bayonet closure 17. In this connection, the cap 7, the jacket 9, the end wall 10, and the connector pipe 18 are configured in such a manner, in this region, that the connector pipe 18 does not project or projects only slightly, with its opening 16, beyond the construction space spanned by the caps 7 and the jacket 9—approximately block-shaped in the example of FIGS. 3*b* and 3*c*.

Figure 3E:
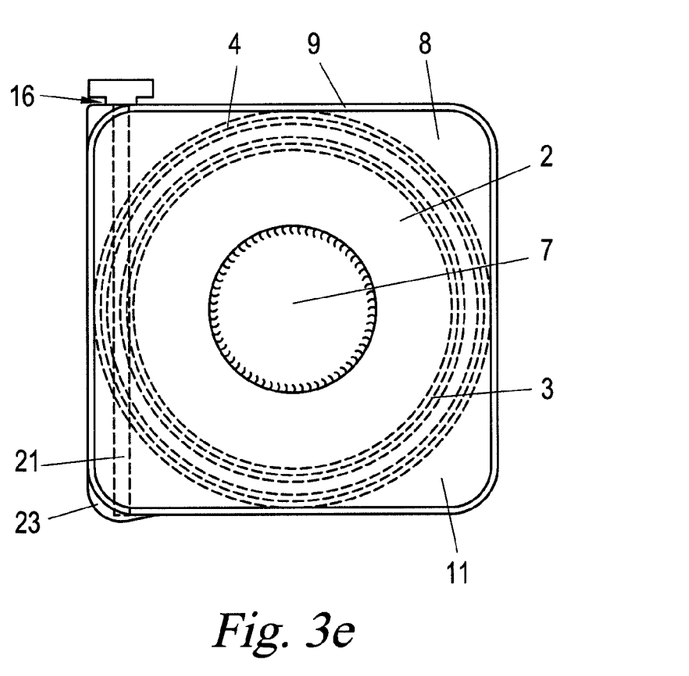

In a further embodiment according to FIGS. 3*d* and 3*e*, an opening 16 configured in a region of the jacket 9, shaped specifically for this purpose—with an optional bayonet closure (not shown)—opens into the space 11*a* between inner container 2, jacket 9, and end wall 10. Here, a fill-level probe 21 is introduced into the space 11*a* by way of the opening 16.

In the said exemplary embodiments, the opening 16 or the bayonet closure 17 can be configured for supplying operating materials, on the one hand, for example as connectors, or, on the other hand, for the purpose of accommodating the fill-level probe 21 (not shown in FIGS. 3*a* to 3*c*), which probe is introduced into the bead 14, according to the example of FIG. 3*a*, into the connector pipe 18, according to the example of FIGS. 3*b* and 3*c*, or into the space 11*a*, according to the example of FIGS. 3*d* and 3*e*. Also, a filling connector 16*a* for an operating material can also be provided as an additional opening, with, or—according to FIG. 3*a*, for example, for only one chamber of the outer container 8—also without a bead 14.

Figure 4:
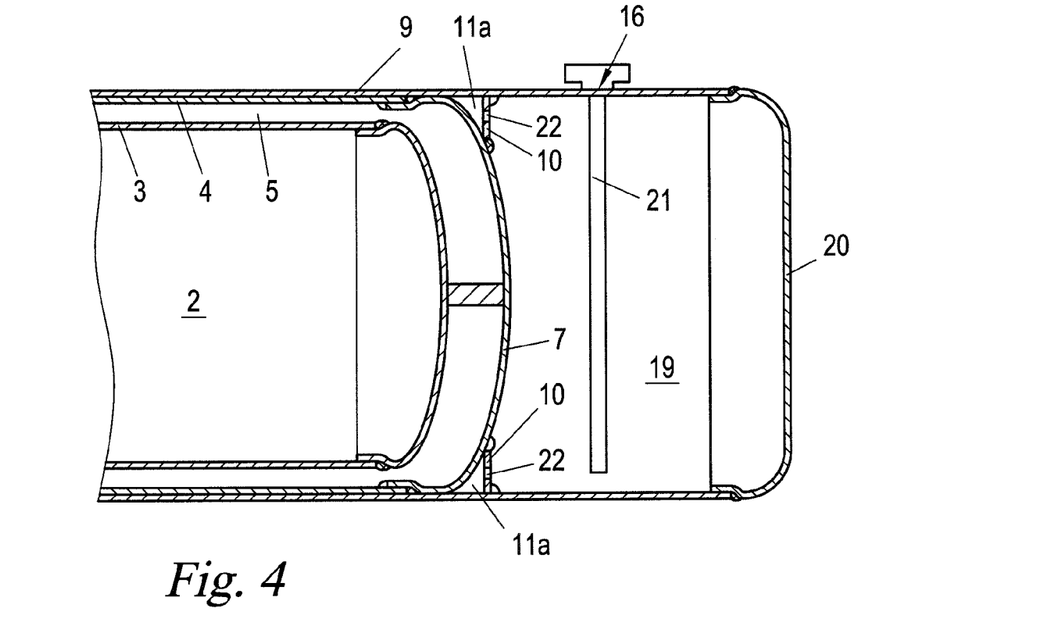
FIG. 4, the combination tank of FIG. 1a with a further shaped container in longitudinal section.

According to a further embodiment of the combination tank 1 according to FIG. 4, the jacket 9 forms a further container 19. For this purpose, the jacket 9 projects beyond the inner container 2, in the longitudinal direction, at least on one side, and is closed off with an end lid 20.

According to FIG. 4, the jacket 9 also has a closable opening 16 in the region of the further container 19, into which a fill-level probe 21 is inserted. Alternatively, the opening 16 can also be configured for supplying operating material.

The further container 19 can be sealed off with regard to the outer container 8, and can accommodate an additional operating material. In the exemplary embodiment of FIG. 4, the further container 19 is, in contrast, connected with the outer container 8, in that the end wall 10 that lies in between has connection openings 22 penetrating it, so that operating material can flow from the outer container 8 into the further container 19, and vice versa.

It is understood that an opening 16 or a filling connector 16*a* for filling the outer container 8 with operating material, and a further opening 16 for the fill-level probe 21, according to one or two suitable embodiments of the exemplary embodiments according to FIG. 3a to 3e or 4 can be provided. If desired, the fill-level probe 21 can furthermore be combined with an operating material extraction line. As shown in FIG. 3e, as an example of all the embodiment variants, a tank sump 23 can be formed in the bottom of the outer container 8, into which sump the extraction line, combined with the fill-level probe 21—or separate from it—projects.

The inner container can be filled, in conventional manner, by way of fittings (not shown) in at least one of its end caps 7.

The invention is not restricted to the embodiments shown, but rather comprises all the variants and modifications that fall within the scope of the following claims.

What is claimed is:

1. Combination tank having a double-walled inner container for temperature-insulated accommodation of a cryogenic fluid, which inner container has an approximately circular cylindrical cross-section and is closed off with end-side caps, wherein an outer container for accommodating at least one operating material is configured around the inner container, which outer container has a jacket having an approximately rectangular cross-section and end walls supported on the inner container, which end walls either sit in gussets that remain between inner container and jacket, or are penetrated by the caps of the inner container.

2. Combination tank according to claim 1, wherein at least one of the end walls is connected with the inner container and the jacket by means of gluing or welding.

3. Combination tank according to claim 1, wherein an outer wall of the inner container, the jacket of the outer container, and the end walls are produced from metal.

4. Combination tank according to claim 1, wherein the jacket is formed of one piece and closed by means of a longitudinal weld seam.

5. Combination tank according to claim 1, wherein the jacket is composed of two, three or four shaped parts and closed by means of longitudinal weld seams, in each instance.

6. Combination tank having a double-walled inner container for temperature-insulated accommodation of a cryogenic fluid, which inner container has an approximately circular cylindrical cross-section and is closed off with end-side caps, wherein an outer container for accommodating at least one operating material is configured around the inner container, which outer container has a jacket having an approximately rectangular cross-section and end walls supported on the inner container, which end walls either sit in gussets that remain between inner container and jacket, or are touched or penetrated by the caps of the inner container, wherein the jacket is formed of one piece and closed by means of a longitudinal weld seam, and wherein the said longitudinal weld seam is structured as a triple-sheet weld seam, by means of which the jacket is simultaneously welded to the inner container.

7. Combination tank having a double-walled inner container for temperature-insulated accommodation of a cryogenic fluid, which inner container has an approximately circular cylindrical cross-section and is closed off with end-side caps, wherein an outer container for accommodating at least one operating material is configured around the inner container, which outer container has a jacket having an approximately rectangular cross-section and end walls supported on the inner container, which end walls either sit in gussets that remain between inner container and jacket, or are touched or penetrated by the caps of the inner container, wherein the jacket is composed of two, three or four shaped parts and closed by means of longitudinal weld seams, in each instance, and wherein the said longitudinal weld seams are structured as triple-sheet weld seams, by means of which the jacket is simultaneously welded to the inner container.

8. Combination tank having a double-walled inner container for temperature-insulated accommodation of a cryogenic fluid, which inner container has an approximately circular cylindrical cross-section and is closed off with end-side caps, wherein an outer container for accommodating at least one operating material is configured around the inner container, which outer container has a jacket having an approximately rectangular cross-section and end walls supported on the inner container, which end walls either sit in gussets that remain between inner container and jacket, or are touched or penetrated by the caps of the inner container, wherein the jacket has at least one bead that runs in a circumferential direction and is shaped outward, which bead bridges a region in which the jacket otherwise touches the inner container.

9. Combination tank according to claim 8, wherein a closable opening is configured on a top of the outer container, which opening opens into the bead.

10. Combination tank according to claim 9, wherein a fill-level probe is introduced into the bead by way of the said opening.

11. Combination tank according to claim 1, wherein a closable opening is configured on a top of the outer container, which opening opens into a space between inner container, jacket, and end wall.

12. Combination tank according to claim 11, wherein a fill-level probe is introduced into the space by way of the said opening.

13. Combination tank according to claim 1, wherein a connector pipe having a closable opening is formed on an end wall, which connector pipe opens into the outer container.

14. Combination tank according to claim 13, wherein a fill-level probe is introduced into the connector pipe by way of the said opening.

15. Combination tank according to claim 1, wherein the jacket projects beyond the inner container in a longitudinal direction, to form a further container, and is closed off with an end lid.

16. Combination tank according to claim 15, wherein the jacket has a closable opening in a region of the further container.

17. Combination tank according to claim 16, wherein a fill-level probe is introduced into the further container by way of the said opening.

18. Combination tank according to claim 15, wherein the further container is connected with the outer container by way of connection openings penetrating the end wall that lies in between.

19. Combination tank having a double-walled inner container for temperature-insulated accommodation of a cryogenic fluid, which inner container has an approximately circular cylindrical cross-section and is closed off with end-side caps, wherein an outer container for accommodating at least one operating material is configured around the inner container, which outer container has a jacket having an approximately rectangular cross-section and end walls supported on the inner container, which end walls either sit in gussets that remain between inner container and jacket, or are touched or penetrated by the caps of the inner container, wherein a tank sump is disposed in the bottom of the outer container, into which sump an extraction line combined with a fill-level probe projects.

* * * * *